(12) United States Patent
Barger et al.

(10) Patent No.: US 7,787,331 B2
(45) Date of Patent: Aug. 31, 2010

(54) SENSOR FOR AIRBORNE SHOOTER LOCALIZATION SYSTEM

(75) Inventors: James E. Barger, Winchester, MA (US); John Stanley, Wilmington, MA (US)

(73) Assignee: BBN Technologies, Corp., Cambridge, MA (US)

( * ) Notice: Subject to any disclaimer, the term of this patent is extended or adjusted under 35 U.S.C. 154(b) by 288 days.

(21) Appl. No.: 12/119,783

(22) Filed: May 13, 2008

(65) Prior Publication Data
US 2009/0285055 A1 Nov. 19, 2009

(51) Int. Cl.
G01S 3/80 (2006.01)
G01H 11/00 (2006.01)
B64C 27/04 (2006.01)

(52) U.S. Cl. .................................................... 367/188
(58) Field of Classification Search ................. 367/188, 367/178, 140; 381/359, 71.7; 244/17.11
See application file for complete search history.

(56) References Cited

U.S. PATENT DOCUMENTS

| | | | |
|---|---|---|---|
| 7,126,877 B2 | 10/2006 | Barger et al. | |
| 7,190,633 B2 | 3/2007 | Brinn et al. | |
| 7,292,501 B2 | 11/2007 | Barger | |
| 2005/0063560 A1* | 3/2005 | Soutar et al. | 381/359 |
| 2009/0046882 A1* | 2/2009 | Sakurai et al. | 381/359 |
| 2009/0285055 A1* | 11/2009 | Barger et al. | 367/188 |

FOREIGN PATENT DOCUMENTS

| | | |
|---|---|---|
| WO | WO 2006/096208 A2 | 9/2006 |
| WO | WO 2006/104511 A2 | 10/2006 |

OTHER PUBLICATIONS

Written Opinion and Search Report for International Patent Application No. PCT/US2009/002930, dated Jan. 14, 2010 (10 pages).

* cited by examiner

*Primary Examiner*—Dan Pihulic
(74) *Attorney, Agent, or Firm*—Wolf, Greenfield & Sacks, P.C.

(57) ABSTRACT

A sensor assembly suitable for use in an airborne shooter localization system. The sensor assembly has a pressure sensor subassembly with a pressure transducer positioned to detect pressure variations associated with a shock wave from a passing projectile or the muzzle blast following the shock wave. To substantially increase the signal to noise ratio for measurements of the shock wave, the pressure sensor subassembly attenuates pressure fluctuations triggered by turbulent airflow over the surface of the subassembly more than it attenuates the shock wave. This preferential attenuation is provided by separating the pressure transducer from the surface of the sensor assembly by a cavity large enough that the pressure fluctuations are substantially attenuated as they propagate across the cavity. Additionally, features of a housing that holds the pressure sensor subassembly facilitate use on an aircraft. Those features include flexibility that allows the sensor assembly to conform to curved surfaces, a skin that provides resistance to environmental conditions and allows the sensor assembly to be attached with an adhesive, and a body region that provides high vibrational impedance to prevent low frequency mechanical vibrations from being coupled to the pressure transducer.

20 Claims, 4 Drawing Sheets

SENSOR FOR AIRBORNE SHOOTER LOCALIZATION SYSTEM

FEDERALLY SPONSORED RESEARCH

This invention was made with Government support under HR0011-07-C-0103. The Government has certain rights to this invention.

BACKGROUND OF THE INVENTION

1. Field of Invention

This invention relates generally to electronic warfare systems and more specifically to sensors for detection of shock waves from projectiles.

2. Discussion of Related Art

In combat zones and other locations where concealed enemies may shoot at people or vehicles, it is desirable to be able to quickly identify the origin of a projectile, such as a bullet. By determining the origin of the projectile, the location of a shooter of that projectile can be identified, and defensive measures, such as moving away from the shooter or suppressing the shooter's ability to continue shooting, can be taken.

Examples of shooter localization systems are provided in U.S. Pat. Nos. 7,126,877; 7,190,633 and 7,292,501, which are hereby incorporated by reference in their entireties. Systems as described in these patents have been constructed for mounting on Humvees and other vehicles deployed in conflict areas.

Such systems employ arrays of acoustic sensors that can detect both shock waves generated as a projectile travels through air and the muzzle blast that follows. Those shock waves and muzzle blasts propagate to the acoustics sensors, where they are detected. As a projectile passes the system, its shock wave and muzzle blast will reach different sensors in the array at different times, depending on the trajectory of the projectile. By comparing arrival times of signals received at different sensors of the array, the trajectory of a projectile may be determined. Through a series of mathematical calculations, the trajectory of the projectile may be extended back to the source of the projectile, revealing the location of the shooter who launched the projectile. It is not necessary that the muzzle blast signal be recognized, but it is helpful to the solution when it is.

SUMMARY OF INVENTION

The invention relates to a sensor assembly and an aircraft incorporating a pressure sensor assembly.

In one aspect, the sensor assembly may have a domed surface member having an opening therein. A porous member is mounted in the opening, and a pressure sensor is mounted with a separation from the porous member. The separation is such that a pressure fluctuation with a frequency of approximately 1 KHz induced by turbulent airflow across the domed surface is attenuated by at least a factor of 7 as the pressure fluctuation propagates across the distance.

In another aspect, the sensor assembly includes a flexible support member having a first surface and a second surface. The flexible support member has a region between the first surface and the second surface, and the flexible support member has an opening extending through the first surface. A pressure sensor sub-assembly is disposed within the opening, spaced from the second surface. The pressure sensor sub-assembly includes a rigid support having a first end and a second end, with a cavity between the first end and the second end. A porous member is positioned at the first end, adjacent the first surface, and a pressure sensor is disposed at the second end.

In a further aspect, an aircraft according to embodiments of the invention may have an outer skin and a plurality of sensor assemblies. Each sensor assembly may include a flexible support member having a domed surface member and a second surface, which is affixed to the outer skin of the aircraft. The flexible support member has a region between the first surface and the second surface. The flexible support member has an opening extending through the first surface. A porous member is mounted in the opening in the domed surface, and a pressure sensor is fixedly coupled to, but separate from, the porous member.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

The inventors have recognized and appreciated the desirability of expanding the use of shooter localization systems to helicopters and other aircraft. However, an aircraft, and particularly a helicopter, presents a difficult environment for detecting both shock waves from a projectile and muzzle blasts from the weapon. Motion of an aircraft produces a rapid airflow across a sensor mounted to an exterior surface of an aircraft. Such an airflow is turbulent near the skin of the aircraft and creates pressure fluctuations that would interfere with an acoustic sensor mounted to detect a shock wave from a projectile passing the aircraft.

Further challenges are presented in using acoustic sensors on a helicopter. Rotors of the helicopter cause airflow, which would also interfere with acoustic sensors. Further, a motor driving a helicopter rotor and other moving parts within a helicopter create vibrations that also tend to interfere with acoustic sensors mounted to detect shock waves and muzzle blasts. However, according to embodiments of the invention, a sensor for detecting shock waves from projectiles is provided. In some embodiments, the sensor is suitable for use in an aircraft, including a helicopter.

According to some embodiments of the invention, a sensor assembly suitable for use in an airborne shooter localization system is provided. The sensor assembly may include a pressure sensor capable of detecting shock waves generated by a projectile and muzzle blasts generated by the weapon. The sensor may be packaged within a housing that is adapted to preferentially attenuate pressure fluctuations caused by turbulent airflow across the sensor assembly. Though the housing may attenuate both a shock wave from a projectile and pressure fluctuations caused by turbulent airflow, with preferential attenuation, an output signal of the pressure sensor may have a signal to noise ratio adequate for use in an airborne shooter localization system.

The sensor assembly may have a shape adapted for use in an airborne environment. The housing may present a domed outer surface, which may reduce the amount of turbulence in the vicinity of the sensor assembly, thereby promoting a sensor output with an adequate signal to noise ratio. Also, the housing may be made of a material presenting a high acoustic impedance to prevent mechanical vibrations on the aircraft from interfering with the sensor. Further, the housing for the sensor assembly may be flexible such that the sensor assembly can be mounted to the skin of an aircraft, even if the skin is not flat, facilitating mounting at a wide range of locations on the aircraft. Because the mounting locations for the sensor assemblies are relatively unconstrained, mounting locations that contribute to accurate detection of shock waves may be selected, which may in turn lead to more accurate calculation of the trajectory of a projectile and localization of the shooter. The material used in forming the housing may also contribute to use of the sensor assembly in an airborne shooter localization system. In some embodiments, the housing may be of a material that allows mounting using epoxy or other adhesives and can withstand environmental conditions that may occur on an aircraft.

Figure 1:
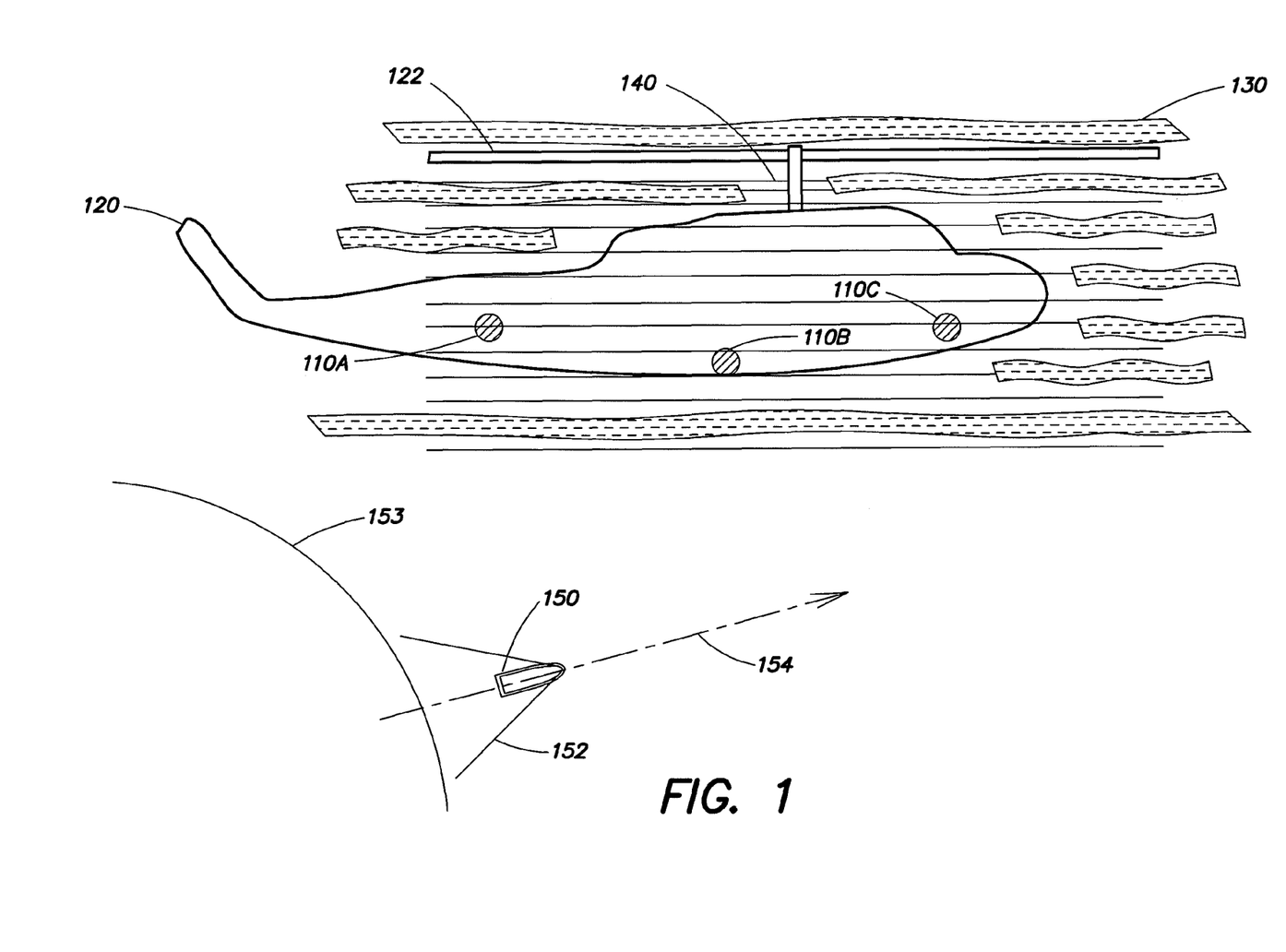
FIG. 1 is a sketch of aircraft equipped with sensors according to an embodiment of the invention.

FIG. 1 illustrates an environment in which embodiments of the invention may be employed. As illustrated, helicopter 120 is equipped with a shooter localization system. The system receives inputs from acoustic sensors contained within sensor assemblies 110A, 110B and 110C. In the example of FIG. 1, three sensor assemblies are illustrated. However, a shooter localization system may include numerous sensors positioned at multiple locations on exterior surfaces of helicopter 120. These sensors may be positioned, for example, to ensure that multiple sensors receive shock waves from a projectile traveling in the vicinity of helicopter 120, regardless of the exact location or trajectory of the projectile. Accordingly, a shooter localization system according to embodiments of the invention may include more than three sensor assemblies, but only three are shown for simplicity.

The exact mounting locations of sensors may be selected in any suitable way and may entail consideration of multiple factors. For example, mounting locations may be selected to place multiple sensors on each side and on the bottom on helicopter 120. Additionally, the mounting locations may be selected to spatially separate the sensors. Locations for mounting the sensors also may be selected to avoid openings, panels or other structural components of helicopter 120. Thus, the number and location of sensor assemblies is not critical to the invention.

According to some embodiments of the invention, each sensor assembly may be approximately circular. The sensor assemblies may be flexible to conform to the shape of the skin of helicopter 120 at the selected mounting locations. Each sensor assembly may have outer surfaces that resist moisture and other environmental conditions to which the sensor assembly may be exposed in operation. Additionally, the portions of the sensor assembly mounted against the skin of helicopter 120 may be of a material suitable for use of adhesive to attach the sensor assembly to the skin of the aircraft 120.

Regardless of the exact number and position of the sensor assemblies, some or all of the acoustic sensors will be mounted such that airflow 140 from rotor 122 will pass over the sensor assemblies 110A, 110B and 110C. Further, some or all of the sensor assemblies will be exposed to airflow 130, which is generated as helicopter 120 travels. The net effect of all sources of airflow across sensor assemblies 110A, 110B and 110C is to create a turbulent boundary layer. Such a turbulent boundary layer acts as a source of noise for acoustic sensors within sensor assemblies 110A, 110B and 110C.

Accordingly, as projectile 150 traveling along trajectory 154 generates a shock wave 152, the noise associated with a turbulent airflow across sensors 110A, 110B and 110C interferes with detection of shock wave 152. Similarly, in embodiments in which a muzzle blast 153 is to be detected, turbulent airflow is a source of interference. However, sensors according to embodiments of the invention preferentially receive shock wave 152 and/or muzzle blast 153 and suppress noise associated with turbulent airflow. Further, the sensor assemblies 110A, 110B and 110C have housings that isolate the sensors from vibrations triggered by motors and other mechanical components of helicopter 120.

Figure 2A:
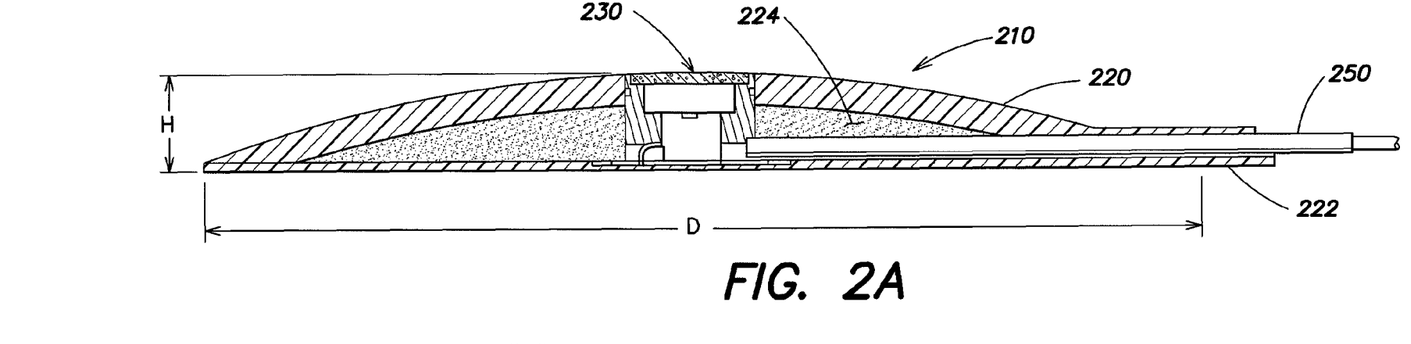
FIG. 2A is a cross-sectional view of a sensor assembly according to some embodiments of the invention.

FIG. 2A illustrates in cross-section a sensor assembly 210 according to embodiments of the invention. As illustrated, sensor assembly 210 may be generally dome shaped. A lower surface 222 may be generally flat and adapted for mounting against an exterior surface of an aircraft. Though, in the embodiment illustrated, sensor assembly 210 is constructed using flexible materials, which allows the sensor assembly to be mounted to curved surfaces.

The cross section of FIG. 2A is taken in a plane perpendicular to the skin of the aircraft to which sensor assembly 210 is mounted. In the embodiment illustrated, each sensor assembly is generally circular, presenting the domed cross section as illustrated in FIG. 2A to airflow across the sensor assembly, regardless of orientation of the sensor assembly relative to the direction of motion of an aircraft to which the sensor assembly is mounted. In other embodiments, a non-circular sensor assembly may be used, but the sensor assembly may nonetheless present a cross section as illustrated to airflow caused by motion of the aircraft. In yet other embodiments, a sensor assembly may have another aerodynamic cross-section to reduce turbulence in the flow across the sensor assembly. Though a sensor assembly may have any suitable cross section.

In the embodiment illustrated, sensor assembly 210 has a domed surface 220 extending above lower surface 222. In the embodiment illustrated, domed surface 220 extends a height, H, above lower surface 222. According to some embodiments, sensor assembly 210 has an aspect ratio of greater than about 8:1, meaning that the perimeter of the sensor assembly extends a distance, D, which is greater than eight times the height, H. A dome with such an aspect ratio provides relatively little disruption to airflow across sensor assembly 210.

A sensor assembly according to embodiments of the invention may be constructed with any suitable dimensions. According to some embodiments of the invention, the height, H, may be in the range of approximately 0.5 inches to approximately 3 inches. In some embodiments, the height, H, may be approximately 1 inch. The distance, D, may be in the range of approximately 4 inches to approximately 24 inches. In some embodiments, the distance D is in the range from approximately 4 inches to approximately 8 inches. As a specific example, D may be 160 mm and H may be 16 mm.

In the embodiment illustrated in FIG. 2, a pressure sensor sub-assembly 230 is mounted within an opening in domed surface 220. Domed surface 220 provides sufficient support to pressure sensor sub-assembly 230 to maintain pressure sensor sub-assembly 230 set off from lower surface 222. Accordingly, when lower surface 222 is affixed to the skin of an aircraft, any vibrations propagating along the skin are not directly coupled to pressure sensor sub-assembly 230. Rather, vibrations can only reach pressure sensor sub-assembly 230 by propagating through the housing for sensor assembly 210.

Though domed surface 220 may propagate vibrations from lower surface 222 to pressure sensor assembly 230, any such vibrations are substantially attenuated before reaching pressure sensor sub-assembly 230. To achieve vibration isolation, domed surface 220, though rigid enough to support pressure sensor sub-assembly 230, is flexible enough to provide a high acoustic impedance to vibrations with a frequency in the range associated with mechanical vibrations in an aircraft.

According to some embodiments of the invention, a domed surface 220 with sufficient mechanical integrity to support pressure sensor sub-assembly 230 but sufficient compliance to provide a high acoustic impedance is achieved by supporting domed surface 220 with a low density flexible material. In the embodiment illustrated, domed surface 220 is supported by foam region 224. Though, any suitable support structure may be used. According to some embodiments, foam region 224 may be formed of an open celled polyurethane foam.

Such foams, and fabrication techniques using such foams, are known in the art, and any suitable fabrication technique may be used to form domed surface 220 supported by foam region 224. As one example, a vacuum molding operation may be used to form foam region 224 simultaneously with domed surface 220 and lower surface 222. Using such a vacuum molding operation, domed surface 220 and lower surface 222 may be formed as one continuous skin surrounding foam region 224. With such a construction, domed surface 220 and lower surface 222 will be smooth polyurethane surfaces, which will be generally resistant to environmental conditions, such as moisture. However, foam region 224 will be relatively soft and therefore a good absorber of low frequency vibrations, including vibrations in the range of approximately 1 kHz or less, which are common on helicopters because of rotor noise.

Pressure sensor sub-assembly 230 outputs an electrical signal in proportion to the pressure applied to pressure sensor sub-assembly 230. This electrical signal may be communicated over cable 250 to an electronic system processing signals form multiple sensors. In the embodiment illustrated, cable 250 may be a coaxial cable.

In some embodiments, cable 250 is inserted into sensor assembly 210 through a tubular opening formed during vacuum molding of sensor assembly 210. In such an embodiment, there may be space between the outer skin of sensor assembly 210 and cable 250, acting as an air vent. Such an air vent may provide a mechanism for the pressure within foam region 224 to equalize relative to the exterior pressure.

As a specific example, the sensor assembly may contain a pressure equalization tube of 50 mil diameter. Though, any suitable pressure equalization mechanism may be used. Use of open celled foam to form region 224 facilitates pressure equalization by precluding air from being trapped within cells of the foam, which could expand or contract as an aircraft to which sensor 210 is mounted changes altitude. If the pressure within sensor assembly 210 did not equalize to ambient pressure with altitude changes, sensor assembly 210 could be deformed by pressure differentials as the aircraft changed altitude. Deformation could in turn alter the airflow across the sensor assembly, creating more turbulence, or could decrease the acoustic impedance of the housing of sensor assembly 210, both of which would decrease the accuracy with which pressure fluctuations are measured. Accordingly, in embodiments in which a mounting mechanism for cable 250 does not act as a mechanism for pressure equalization, a separate vent or other structure may be included within sensor assembly 210.

Figure 2B:
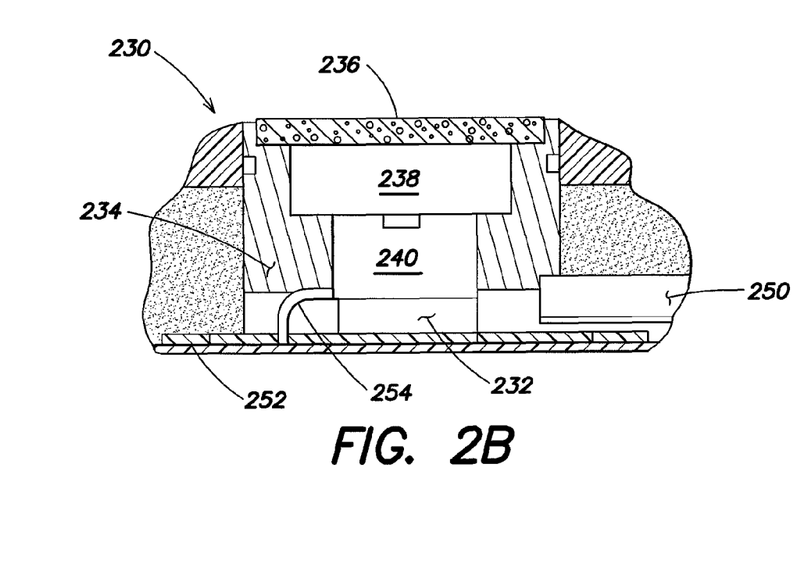
FIG. 2B is an enlarged view of a pressure sensor sub-assembly of the sensor of the sensor assembly FIG. 2A.

FIG. 2B is an enlarged view of pressure sensor sub-assembly 230. FIG. 2B illustrates features that may be used according to some embodiments to facilitate preferential attenuation of turbulence induced pressure fluctuations. These fluctuations constitute noise for a system measuring shock waves from a projectile, and, by attenuating the fluctuations, the signal to noise ratio is increased.

Pressure sensor sub-assembly 230 may include any suitable pressure sensor. In the embodiment of FIG. 2B, microphone 240 acts as a pressure sensor. In some embodiments, a commercially available microphone may be used. As a specific example, a microphone with a piezo-electric actuator providing a measurement bandwidth of approximately 1 KHz to 20 KHz may be employed. Such an actuator may be constructed in an hermetically sealed package providing a two wire analog output. The piezo-electric actuator may be packaged to provide acceleration canceling, as is known in the art of microphone design. As a specific example, such a microphone may be commercially procured as model number PCB103B from PCB Piezotronics, Inc.

As illustrated, microphone 240 may be attached to a support structure, which may in turn be attached to domed surfaced 220. In this way, microphone 240 may be suspended from domed surface 220, but is set back from domed surface 220. The support structure may be sized so that microphone 240 is spatially separated from lower surface 222 (FIG. 2A), which provides vibrational resistance.

In this example, the support member to which microphone 240 is attached is case 234. As a specific example, case 234 may be implemented as a rigid, cylindrical member. In the embodiment illustrated, case 234 may be constructed as a brass cylinder. Such a shape may be desirable for use in a circular sensor assembly as illustrated in the embodiment of FIGS. 2A and 2B. However, any suitable material or materials may be used to form case 234. Likewise, case 234 may have any suitable shape.

In the embodiment illustrated, case 234 also provides a mechanism for mounting a member to separate microphone 240 from air flowing across the outer surface of sensor assembly 210. In the embodiment illustrated, plate 236 is mounted to case 234 to separate microphone 240 from air flowing across sensor assembly 210. Plate 236 is formed of a material that passes a shock wave associated with a projectile passing in the vicinity of sensor assembly 210. For example, plate 236 may be formed of a porous material. The pores of such material may be sufficiently small to prevent dust and other contaminants from entering pressure sensor sub-assembly 230, but may be sufficiently large to enable shock waves to pass through plate 236. In some embodiments of the invention, the pores of plate 236 may be on average 100 microns in diameter or less. In other embodiments, the pores may be 30 microns in diameter or less. As a specific example, the pores may be approximately 20 microns in diameter. Plate 236 may be relatively thin. In some embodiments, plate 236 may be less than 5 mm thick. As a specific example, a sintered stainless steel screen with a diameter of approximately 19 mm and thickness of approximately 1.6 mm may be used to implement plate 236. Though in other embodiments, plate 236 may be a fabric stretched over the opening.

As illustrated in FIG. 2B, case 234 holds microphone 240 and plate 236 with cavity 238 separating them. Cavity 238 is formed with dimensions that preferentially attenuate pressure fluctuations associated with turbulent airflow across the surface of sensor assembly 210 relative to a shock wave from a projectile. The inventors have recognized and appreciated that a shock wave caused by a projectile will have a supersonic trace velocity across plate 236 when it reaches sensor assembly 210. Because of this, the shock waves will propagate through the surface of plate 236. Accordingly, the shock waves will propagate into cavity 238 and will reach microphone 240 with little attenuation within cavity 238. In contrast, pressure fluctuations associated with turbulent airflow across sensor 210 will have subsonic trace velocities across the plate 236, and will decrease in intensity as a function of distance into the cavity 238.

According to some embodiments of the invention, cavity 238 may be formed with a depth that separates microphone 240 from plate 236 by a sufficient amount to ensure that the magnitude of pressure fluctuations associated with turbulent airflow, upon reaching microphone 240, are small relative to the magnitude of a shock wave.

In some embodiments it may by undesirable to make cavity 238 too deep. Increasing the depth of cavity 238 increases the height, H, of sensor assembly 210 and may present additional resistance to airflow across the surface of sensor assembly 210. Increasing the resistance to airflow may increase the amount of turbulence, thereby increasing the amount of noise in a signal output by microphone 240. Also, if the cavity is too deep, internal shockwave reflections will distort the sensor output signal. Accordingly, in some embodiments, cavity 238 may have a depth sufficient to attenuate pressure variations associated with turbulence on an outer surface of plate 236 by a suitable factor, but not so large as to unduly increase the height, H, of sensor assembly 210 or to allow for internal shock wave reflections. According to some embodiments of the invention, cavity 238 will have a depth sufficient to attenuate pressure variations associated with turbulence by at least a factor of 7 at the lowest frequency of interest. In some embodiments, cavity 238 will have a depth sufficient to attenuate pressure variations associated with turbulence at a surface of plate 236 by approximately a factor of 10.

As a specific example, cavity 238 may have a diameter of approximately 55 mm and a depth of between 3 mm and 10 mm. In some embodiments, the depth may be approximately 5 mm. Such a cavity may attenuate pressure fluctuations with a frequency of approximately 1 KHz by approximately a factor of 10. Higher frequency components will experience a greater attenuation.

Pressure fluctuations with lower frequency components may be attenuated less. However, because a shock wave caused by a projectile may have frequency components of 1 KHz or higher, an electronic system to which the output of microphone 240 is connected may be sensitive to signals of 1 KHz or higher. Accordingly, even if pressure sensor sub-assembly 230 does not attenuate such low frequency components, the overall shooter localization system may nonetheless be non-responsive to such low frequency components, allowing a signal from a shock wave to be accurately measured even in the absence of such low frequency components. Thus, preferential attenuation of pressure fluctuations associated with turbulent airflow may occur only over a portion of interest in the frequency spectrum. Such a portion, for example, may be the overlap of spectra of the sock wave and the pressure fluctuations associated with turbulence.

FIG. 2B shows additional details of pressure sensor sub-assembly 230 according to some embodiments. As shown, microphone 240 is mounted within case 234 to be spaced from lower surface 222 by cavity 232. Cavity 232 provides isolation between microphone 240 and any vibrations that may be coupled to sensor assembly 210 through the skin of an aircraft to which sensor assembly 210 may be mounted. Cavity 232 may be of any suitable size that prevents microphone 240 from contacting lower surface 222. Accordingly, in some embodiments, cavity 232 will have a depth of between about 1 mm and 25 mm. In other embodiments, cavity 232 may have a depth between about 2 mm and about 10 mm.

In the embodiment illustrated, electrical connections are made to microphone 240 through a flexible coupling 254. Flexible coupling 254 routes electrical signals between microphone 240 and a location to which electrical connections can be made. Because of the flexibility provided by flexible coupling 254, it presents a high acoustic impedance to vibration signals that may be transmitted through the skin of an aircraft to which sensor assembly 210 may be mounted. Nonetheless, fixed connections may be made within sensor assembly 210 to facilitate the output of electrical signals produced by microphone 240 and/or the introduction of power or control signals for operation of microphone 240.

In the example illustrated, flexible coupling 254 attaches to a substrate, such as printed circuit board 252. Conductors within cable 250 may also be electrically connected to printed circuit board 252. Within the printed circuit board 252, connections can be made between conductors of cable 250 and conductors serving as inputs or outputs to microphone 240.

Circuit board 252 may also serve as a substrate for electronic components to condition or otherwise process signals input or output from microphone 240. As an example, electronic components mounted on circuit board 252 may convert signals output by microphone 240 from analog to digital form. In other embodiments, circuitry on printed circuit board 252 may provide a sampling clock or other control signals that control a suitable microphone assembly to output digital samples representing measured pressure.

Figure 3A:
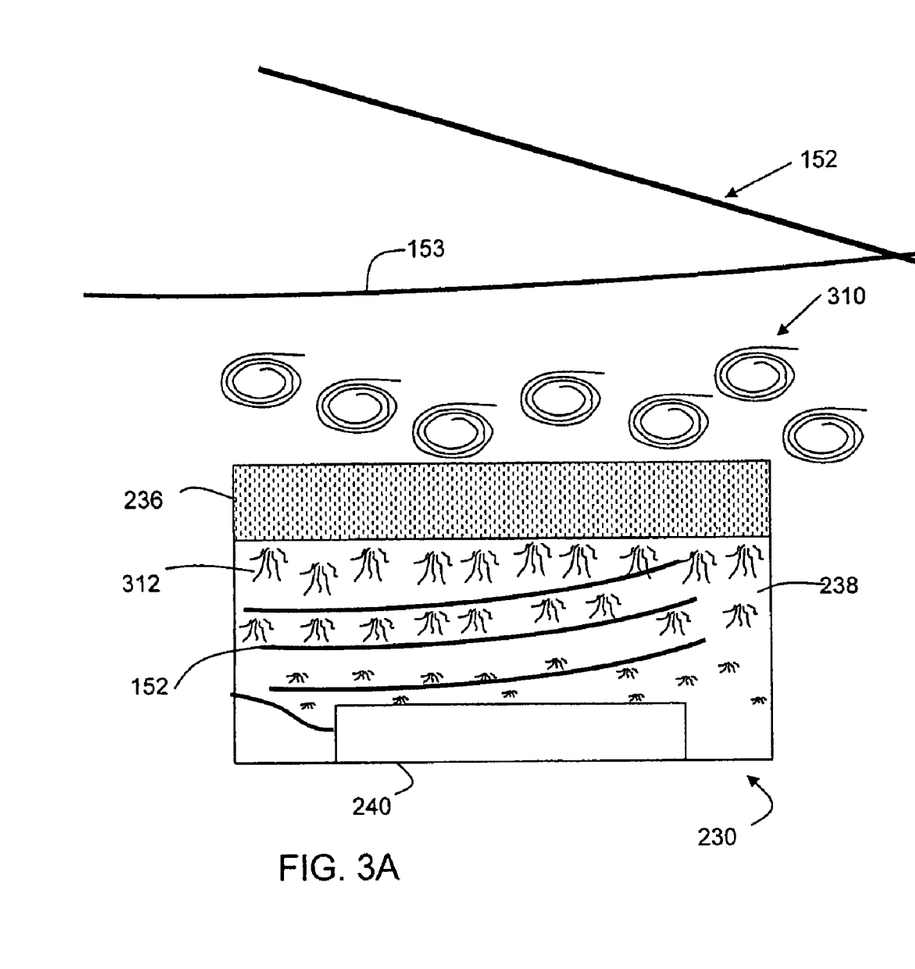
FIG. 3A is a conceptual sketch illustrating operation of the pressure sensor sub-assembly of FIG. 2B.
Figure 3B:
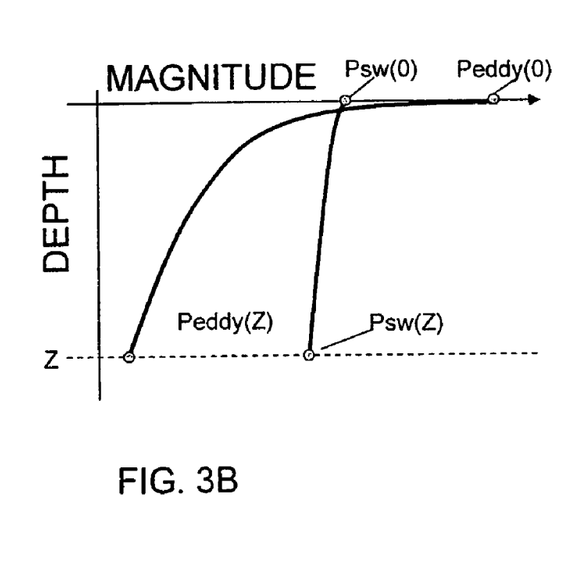
FIG. 3B is a graph illustrating the magnitude of turbulence-introduced interference as a function of position within the pressure sensor sub-assembly of FIG. 3A.

FIGS. 3A and 3B illustrate schematically interaction of the components within pressure sensor sub-assembly 230 to preferentially couple a shock wave to microphone 240 while preferentially attenuating pressure variations caused by turbulent airflow across sensor assembly 210. In the model of FIG. 3A, pressure sensor sub-assembly 230 is shown separated from surrounding structure. This depiction reflects the mechanical isolation of pressure sensor sub-assembly 230 from the aircraft frame provided by domed surface 220, foam region 224 and cavity 232.

Shock wave 152 is shown incident on pressure sensor sub-assembly 230. Though shock wave 152 may be attenuated as it passes through porous plate 236, shock wave 152 is not substantially attenuated as a function of distance as its propagates through cavity 238. Thus, a portion of the pressure variations sensed by microphone 240 will represent shock wave 152.

Eddies 310 associated with non-laminar airflow across the surface of plate 236 also will trigger pressure fluctuations 312 within cavity 238. These fluctuations represent noise for measurement of shock wave 152. Unlike shock wave 152, pressure fluctuations 312 will pass over the plate 236 at a speed nearly equal to the aircraft and will have a magnitude that decays exponentially as a function of distance. Even though eddys 310 may generate pressure variations with a magnitude comparable to or even substantially larger than shock wave 152 at the surface of porous plate 236, by the time the pressure fluctuations 312 associated with eddys 310 propagate across cavity 238 to microphone 240, the variations associated with eddys 310 will have a magnitude small enough to enable shock wave 152 to be accurately measured.

This relationship is illustrated in FIG. 3B. FIG. 3B shows the magnitude of pressure variations associated with shock wave 152 and eddys 310 as a function of depth into cavity 238. As illustrated in FIG. 3B, at a depth of zero, representing the lower surface of plate 236, the magnitude of pressure fluctuations associated with eddys 310, depicted as $P_{eddy}(0)$, is larger than the pressure variations associated with shock wave 152, depicted as $P_{sw}(0)$. However, this relationship is inverted as a result of attenuation as pressure fluctuations pass through cavity 238. At the bottom of cavity 238 where microphone 240 is located, represented at a depth Z, the magnitude of pressure fluctuations associated with eddys 310, depicted as $P_{eddy}(Z)$ is less than the magnitude of the pressure variations associated with shock wave 152, indicated as $P_{sw}(Z)$. $P_{sw}(Z)$ represents the desired signals and $P_{eddy}(Z)$ represents noise. As can be seen, as a result of preferential attenuation the signal output by microphone 240 can have a sufficiently high signal to noise ratio to adequately identify through processing of that signal the characteristics of a shock wave 152 incident upon pressure sensor assembly 230.

FIG. 3B illustrates that the pressure fluctuations associated with eddys 310 have been attenuated by approximately a factor of 10 as they propagate across cavity 238. In some embodiments, a lesser attenuation, such as attenuation by a factor of 7, may be adequate at a frequency of approximately 1 KHz. Though, in other embodiments, greater attenuation may be provided by making cavity 238 deeper.

FIG. 3B illustrates attenuation versus depth characteristics at a single frequency. Both pressure wave 152 and pressure fluctuations associated with eddys 310 may have a frequency spectra spanning a range. For example, the frequency spectra associated with pressure wave 152 may span the range from approximately 1 KHz to 20 KHz. The frequency spectra associated with pressure variations caused by eddys 310 may span a wider range. However, electronic filtering of signals output by microphone 240 may adequately compensate for frequency components outside that range. Thus, pressure sensor sub-assembly 230 may be designed to preferentially attenuate pressure variations associated with eddys 310 in the frequency range in which the spectra of shock wave 152 and pressure fluctuations 312 overlap. Because higher frequency pressure fluctuations will be attenuated to a greater extent than lower frequency fluctuations, pressure sensor sub-assembly 230 may be designed to provide a desired attenuation at a frequency component at a low end of the overlap in frequency spectra of shock wave 152 and pressure fluctuations associated with eddys 310. In the example herein, that frequency is in the range of 500 KHz to 2 KHz. As a specific example, 1 KHz is taken to be the lowest frequency of interest.

While not being bound by any theory of operation, the following equations demonstrate an approach to selection of parameters for construction of pressure sensor sub-assembly 230. In the embodiment illustrated, the frequency of pressure fluctuations cased by airflow over the sensor assembly is related to the flow velocity, $V_{flow}$, and the diameter of the plate 236, and can be approximated by the following equation:

$$f_{eddy} \approx (0.8) \frac{V_{flow}}{\text{Diameter}}$$

This equation may be used to identify frequency components of turbulence-induced pressure fluctuations. In particular, the equation may be used to identify the lowest frequency that is likely to be present, taking into consideration an anticipated range of airspeeds at which an aircraft carrying a sensor assembly may operate. These frequencies may be compared to the anticipated lower end of the frequency spectrum of a shock wave from a projectile to identify the lowest value of $f_{eddy}$ of interest. For a helicopter with a plate having 20 mm diameter, this frequency is approximately 1 KHz.

The pressure fluctuations induced by turbulence decay exponentially as a function of distance and can be modeled by the following equation:

$$P(z) \propto e^{-\frac{2\pi f z}{v}}$$

in which z represents distance and v represents the speed at which the pressure fluctuations are traveling, and can be approximated as the speed of the aircraft. This equitation may be used to determine an appropriate depth of cavity 238 to provide preferential attenuation. To attenuate the pressure fluctuations by a factor of 10, a value of z can be computed for which P(z) is one tenth the value of P(z), when z=0. This value of z indicates a minimum desired separation between plate 236 and microphone 240, and can be used in determining dimensions of cavity 238. In some embodiments, this distance may be between about 2 mm and 15 mm. In other embodiments, the distance may be between 4 mm and 7 mm.

Though the foregoing equations can be used to select dimensions of pressure sensor sub-assembly 230, other approaches may be used. Simulation and/or empirical approaches may be used instead of or in conjunction with computational approaches to select specific parameters of the design. These design approaches may be used to generate sensor assemblies for use in any desired application.

Figure 4:
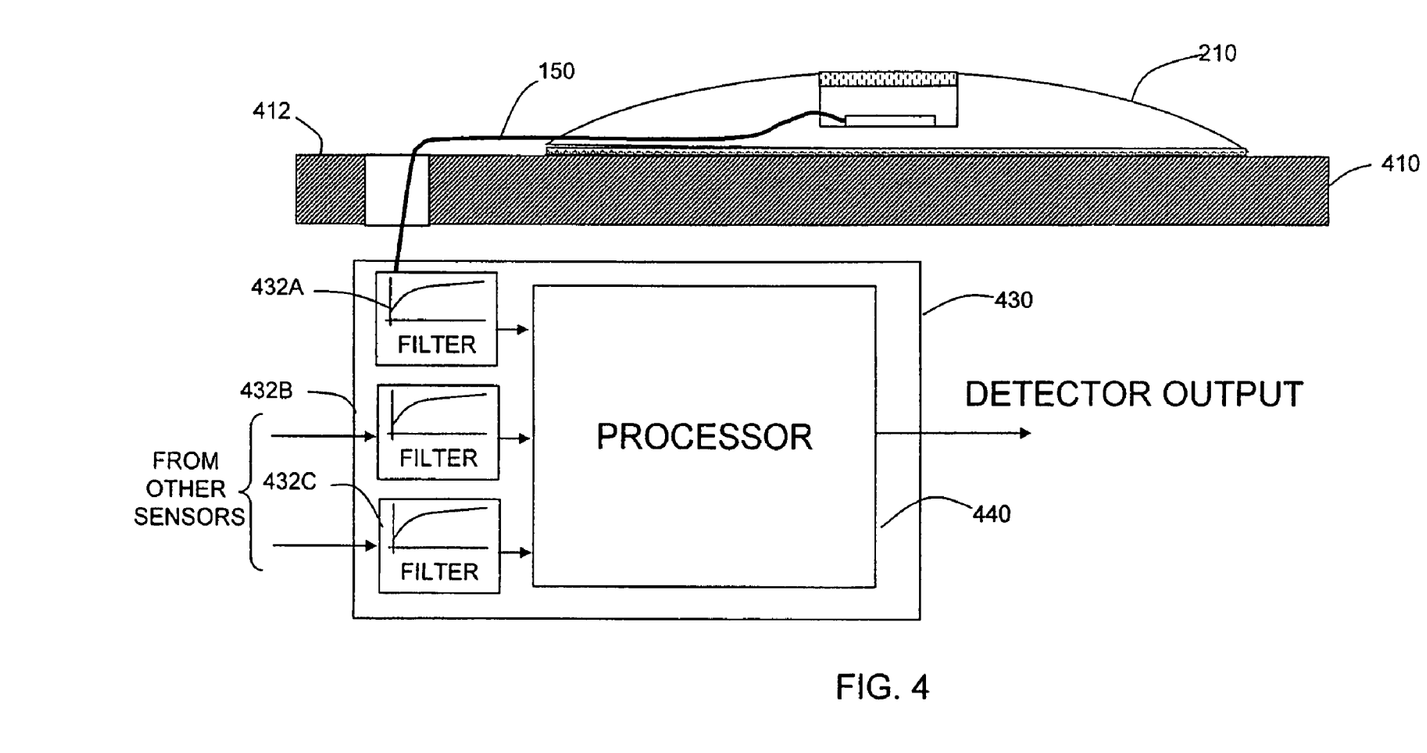
FIG. 4 is a sketch of a sensor assembly as illustrated in FIG. 2A connected to a shooter localization system on an aircraft.

FIG. 4 illustrates one such application of a sensor assembly 210 as described above. In this example, the sensor assembly is part of an airborne shooter localization system. As illustrated in FIG. 4, sensor assembly 210 is mounted to an exterior skin 410 of an aircraft, such as helicopter 120 (FIG. 1). In the embodiment illustrated sensor assembly 210 may be attached to skin 410 using epoxy or other adhesive. However, any suitable mechanism may be used for attaching sensor assembly 210.

As illustrated in FIG. 4, cable 150 leaving sensor assembly 210 passes through a hole 412 in skin 410. Hole 412 may be made and sealed in any suitable way. Within the aircraft, cable 150 may be coupled to an electronics unit 430. Electronics unit 430 may be constructed using techniques as known in the art for constructing airborne electronics system. Similarly, cable 150 and hole 412 may be formed in known ways used in conjunction with electronic systems mounted to aircraft. However, the specific construction of cable 150, hole 412 and electronics unit 430 is not critical to the invention, and any suitable construction techniques may be used.

As illustrated in FIG. 4, cable 150 couples a signal, representing the output of microphone 240 (FIG. 2B), to filter 432A. In the embodiment illustrated, filter 432A may have pass characteristics matching the expected frequency spectra of pressure wave 152. For example, filter 432A may have a pass band spanning approximately 1 KHz to 20 KHz. However, the specific frequency range of filter 432A may depend on one or more parameters of a specific application of sensor assembly 210, and the invention is not limited by the frequency characteristics of electronic equipment to which sensor assembly 210 is connected.

As shown, the signal representing the measured pressure variations is coupled through filter 432A to processor 440. Processor 440 may be a digital signal processor or other suitable processor system. Additionally, other signals output by other sensor assemblies mounted to other locations on skin 410 may similarly be coupled to processor 440. In the example of FIG. 1 in which three sensor assemblies are illustrated, three input signals may be coupled to processor 440 through filters 432A, 432B and 432C. In embodiments in which more sensor assemblies are used, more signals may be coupled to processor 440 and those signals may similarly be coupled through filters.

Processor 440 may be programmed or otherwise constructed to operate on the input signals to detect pressure waves representative of projectiles passing the aircraft. Once detected, the signals representing the pressure waves may be analyzed, including correlating the signals to find relative time difference and to compute the trajectory of the projectile.

Processing approaches as are known in the art for shooter localization systems may be used. Alternatively or additionally, such processing techniques may be adapted for use within an aircraft. Accordingly, the specific processing algorithm implemented by processor 440 is not critical to the invention. However, in the shooter localization system illustrated in FIG. 4, the result of processing within processor 440 is an output indicating the presence of a projectile, the trajectory of the projectile and/or the source of the projectile.

Having thus described several aspects of at least one embodiment of this invention, it is to be appreciated various alterations, modifications, and improvements will readily occur to those skilled in the art. For example, detecting a shockwave is described above. A system to detect a muzzle blast instead of or in addition to a shock wave may be constructed. Such alterations, modifications, and improvements are intended to be part of this disclosure, and are intended to be within the spirit and scope of the invention. Accordingly, the foregoing description and drawings are by way of example only.

What is claimed is:

1. A sensor assembly, comprising:
a domed surface member having an opening therein;
a porous member mounted in the opening in the surface;
a pressure sensor, fixedly coupled to the porous member and separated from the porous member by a distance,
wherein the distance is such that a pressure fluctuation with a frequency of approximately 1 KHz induced by turbulent airflow across the domed surface at the porous membrane is attenuated by at least a factor of 7 as the pressure fluctuation propagates across the distance.

2. The sensor assembly of claim 1, wherein the porous member comprises pores having an average pore diameter of less than 100 microns.

3. The sensor assembly of claim 1, wherein the porous member has pores having an average pore diameter of less than 30 microns.

4. The sensor assembly of claim 3, wherein the porous member comprises sintered stainless steel.

5. The sensor assembly of claim 1, wherein the distance is between 2 mm and 15 mm.

6. The sensor assembly of claim 1, wherein the distance is between 4 mm and 7 mm.

7. The sensor assembly of claim 6, wherein:
the domed surface comprises an outer surface of a flexible support member;
the flexible support member further comprises:
a second surface;
a compressible region disposed adjacent the domed surface and between the domed surface and the second surface.

8. The sensor assembly of claim 7, wherein:
the compressible region comprises an open cell foam;
the pressure sensor comprises a microphone;
the sensor assembly further comprises a rigid support member, the pressure sensor and the microphone being attached to the rigid support, the rigid support member being mechanically coupled to the domed surface member, with the rigid support member separated from the second surface.

9. A sensor assembly, comprising:
a flexible support member having an first surface and a second surface, the flexible support member comprising a region between the first surface and the second surface, the flexible support member having an opening therein, the opening extending through first surface;
a pressure sensor sub-assembly disposed within the opening, the pressure sensor sub-assembly being spaced from the second surface, and the pressure sensor sub-assembly comprising:
a rigid support having a first end and a second end, with a cavity between the first end and the second end;
a porous member disposed at the first end, the first end being positioned adjacent the first surface; and
a pressure sensor disposed at the second end.

10. The sensor assembly of claim 9, wherein the region of the flexible support comprises open cell foam.

11. The sensor assembly of claim 10, wherein the open cell foam comprises open cell polyurethane foam.

12. The sensor assembly of claim 11, wherein first surface and the second surface comprise vacuum molded polyurethane.

13. The sensor assembly of claim 9, wherein the first surface and the second surface comprise non-porous surfaces.

14. The sensor assembly of claim 13, wherein the support member comprises a port adapted to equalize a pressure within the region relative to a pressure outside the region.

15. The sensor assembly of claim 14, wherein the second surface has a planar extent with a smallest dimension and the first surface is domed, providing a maximum separation between the first surface and the second surface, wherein the smallest dimension is at least eight times the maximum separation.

16. An aircraft comprising an outer skin and a plurality of sensor assemblies, each sensor assembly comprising:
a flexible support member having a domed surface member and a second surface, the flexible support member comprising a region between the first surface and the second surface, the flexible support member having an opening therein, the opening extending through first surface;
a porous member mounted in the opening in the domed surface;
a pressure sensor, fixedly coupled to the porous member and separated from the porous member by a distance,
wherein second surface is affixed to the outer skin.

17. The aircraft of claim 16, wherein:
the sensor assembly is circular, having a diameter, and the domed surface extends to a peak that is distance above the second surface that is less than one eighth of the diameter;
the opening is at the peak of the dome.

18. The aircraft of claim 17 wherein:
the sensor assembly further comprises foam between the domed surface and the second surface;
the domed surface and second surface comprise vacuum formed polyurethane forming an enclosure, enclosing the foam; and
the enclosure has an air inlet.

19. The aircraft of claim 15, wherein:
the pressure sensor is separated by a distance over which frequency components of eddies at a frequency are attenuated by a factor of 10 when the eddy propagate across the distance;

the aircraft further comprises:
an electronics assembly comprising a high pass filter having a cutoff frequency such that a signal at the frequency is attenuated by at least 3 dB in the filter;
a signal conductor coupling an output of the pressure sensor to the electronics assembly through the high pass filter.

20. The aircraft of claim 19, wherein the aircraft is a helicopter.

* * * * *